United States Patent
Choi

(10) Patent No.: US 7,580,090 B2
(45) Date of Patent: Aug. 25, 2009

(54) FLAT PANEL DISPLAY HAVING ENHANCED THERMAL DISSIPATION UNIFORMITY

(75) Inventor: Young Kil Choi, Yongin (KR)

(73) Assignee: Samsung SDI Co., Ltd., Suwon-si (KR)

( * ) Notice: Subject to any disclaimer, the term of this patent is extended or adjusted under 35 U.S.C. 154(b) by 284 days.

(21) Appl. No.: 11/518,100

(22) Filed: Sep. 8, 2006

(65) Prior Publication Data

US 2007/0097285 A1    May 3, 2007

(30) Foreign Application Priority Data

Nov. 2, 2005    (KR) .................. 10-2005-0104637

(51) Int. Cl.
   *G02F 1/1333*    (2006.01)
(52) U.S. Cl. ............................ 349/58; 349/149
(58) Field of Classification Search .............. 349/56, 349/84, 122
   See application file for complete search history.

(56) References Cited

U.S. PATENT DOCUMENTS

| | | | | |
|---|---|---|---|---|
| 4,419,399 A | * | 12/1983 | Ichikawa et al. | 428/215 |
| 5,858,624 A | * | 1/1999 | Chou et al. | 430/321 |
| 6,013,983 A | * | 1/2000 | Asano et al. | 313/581 |
| 6,737,790 B2 | | 5/2004 | Seki | |
| 7,348,964 B1 | * | 3/2008 | Gettemy et al. | 345/173 |
| 2005/0212776 A1 | * | 9/2005 | Nakajima | 345/173 |
| 2005/0253643 A1 | * | 11/2005 | Inokawa et al. | 327/517 |
| 2006/0268528 A1 | * | 11/2006 | Zadesky et al. | 361/728 |
| 2007/0229475 A1 | * | 10/2007 | Gettemy et al. | 345/173 |
| 2008/0054795 A1 | * | 3/2008 | Ohmi et al. | 313/504 |

* cited by examiner

*Primary Examiner*—James P Hughes
*Assistant Examiner*—Peter Radkowski
(74) *Attorney, Agent, or Firm*—Christie Parker & Hale LLP

(57) ABSTRACT

A flat panel display is provided having enhanced thermal dissipation uniformity. The flat panel display includes an image display panel wherein a first substrate is spaced apart from a second substrate. A transparent conductive film is formed on the front side of the image display panel. A chassis member is positioned on the rear side of the image display panel. A conductive member connects the transparent conductive film and the chassis member.

10 Claims, 3 Drawing Sheets

FLAT PANEL DISPLAY HAVING ENHANCED THERMAL DISSIPATION UNIFORMITY

CROSS-REFERENCE TO RELATED APPLICATIONS

This application claims priority to and the benefit of Korean Patent Application No. 2005-0104637, filed on Nov. 2, 2005, in the Korean Intellectual Property Office, the entire content of which is incorporated herein by reference.

BACKGROUND

1. Field of the Invention

The present invention relates to a flat panel display, and more particularly to a flat panel display having enhanced thermal dissipation uniformity.

2. Discussion of Related Art

Flat panel displays such as a liquid crystal display (LCD), a plasma display panel (PDP) and, in particular, an electron emission display (EED) have been developed and put to practical use.

The EED has been highlighted as a promising next generation display with regard to view angle, high speed response, high brightness, high definition and thinness.

The EED is typically formed of in triode structure having a cathode electrode, an anode electrode and a gate electrode. More specifically, the cathode electrode being commonly used as a scan electrode is formed on a substrate, and an insulating layer with a hole and the gate electrode being commonly used as a data electrode are stacked on the cathode electrode. An emitter, which is an electron emission source, is formed inside of the hole to contact with the cathode electrode.

In general, the EED has schemes of using a hot cathode and a cold cathode as an electron source. As the electron emission device using the schemes of the cold cathode, the types of a field emitter array (FEA), a surface conduction emitter (SCE), a metal-insulator-metal (MIM), a metal-insulator-semiconductor (MIS) and a ballistic electron surface emitting (BSE) have been known.

The EED typically emits electrons by means of a quantum mechanical tunnel effect by concentrating high electric field on the emitter and accelerates the electrons emitted from the emitter by voltage applied between the cathode electrode and the anode electrode to collide with a red, green, blue (RGB) phosphor layer formed on the anode electrode, light-emitting the phosphor and displaying an image.

FIG. 1 is an exploded schematic perspective view showing a conventional flat panel display and FIG. 2 is a cross sectional view of the flat panel display taken along line I-I' in FIG. 1. The conventional flat panel display 100 includes an image display panel 120 wherein a first substrate 121 is spaced apart from a second substrate 122. A chassis member 130 is provided at a rear side of the image display panel 120. A bottom cover 110 surrounds the rear side of the chassis member 130 and sides of the image display panel 120. A top cover 140 fixes a corner portion of a front side and is coupled to the bottom cover 110.

In the image display panel 120, the first substrate 121, which is an electron emission substrate, is spaced apart from the second substrate 122, which is an image forming substrate. A vacuum state is maintained between the first substrate 121 and the second substrate 122. A supporting member 123 is included between and supports the first substrate 121 and second substrate 122.

In the image display panel 120 a data driver 124a provides a data signal and a scan driver 124b provides a scan signal, respectively.

Significant heat is generated from the data driver 124a and the scan driver 124b when providing signals to the image display panel 120, due to a significant amount of current. The entire temperature of the panel rises as a result of the generated heat.

Heat generated during the driving of the image display panel 120 is dissipated by means of the chassis member 130 provided on the rear side.

However, when the chassis member 130 contacts only the rear side of the second substrate of the image display panel to reduce the temperature of the second substrate and, due to the typical rigidity of a spacer between the first substrate and the second substrate, non-uniformity in the temperature between the first substrate and the second substrate can result, and, in turn, cause distortion of the emission beam. The phosphor around the spacer then fails to light-emit uniformly, resulting in poor image display.

SUMMARY OF THE INVENTION

In accordance with the present invention a flat panel display is provided having enhanced thermal dissipation uniformity.

In an exemplary embodiment a flat panel display includes an image display panel wherein a first substrate is spaced apart from a second substrate. A transparent conductive film is formed on the front side of the image display panel. A chassis member is positioned on the rear side of the image display panel. A conductive member connects the transparent conductive film and the chassis member.

The transparent conductive film on the front side of the second substrate may be coated with a conductive substance and may be formed of a thermal conductive substance to conduct heat to the chassis member through the conductive member.

The conductive member may be formed in a conductive tape of copper substance and may be formed in at edge areas of the front, side and rear of the image display panel to connect the chassis member with the transparent conductive film.

DETAILED DESCRIPTION

Figure 1:
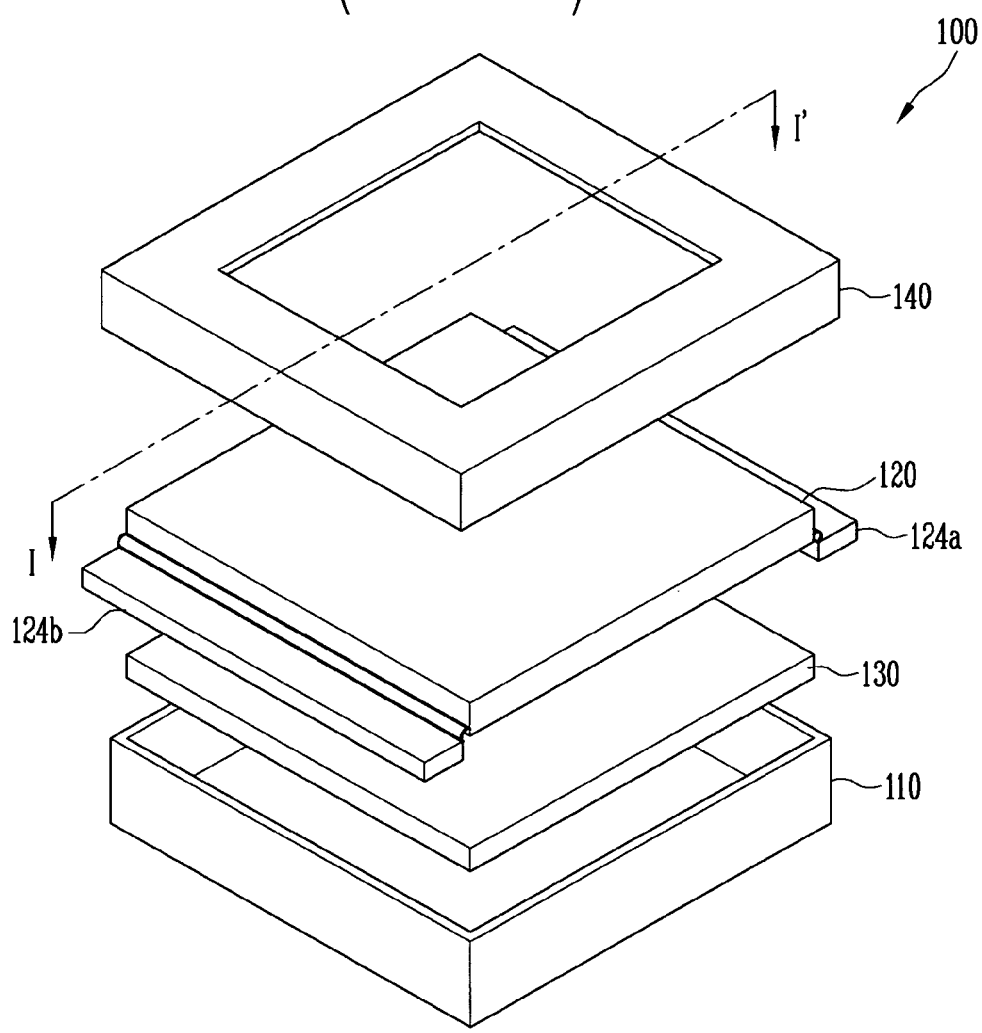
FIG. 1 is an exploded schematic perspective view showing the constitution of a conventional flat panel display.
Figure 2:
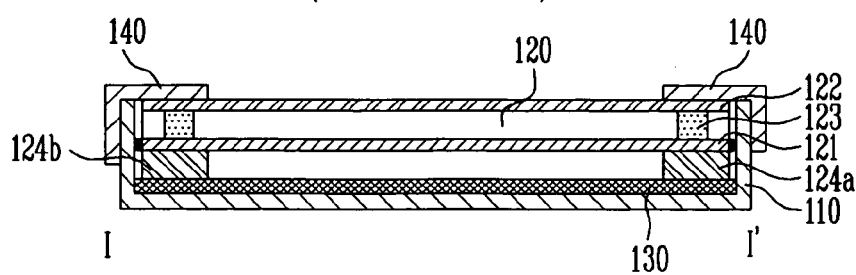
FIG. 2 is a cross sectional view of the flat panel display taken along line I-I' in FIG. 1.
Figure 3:
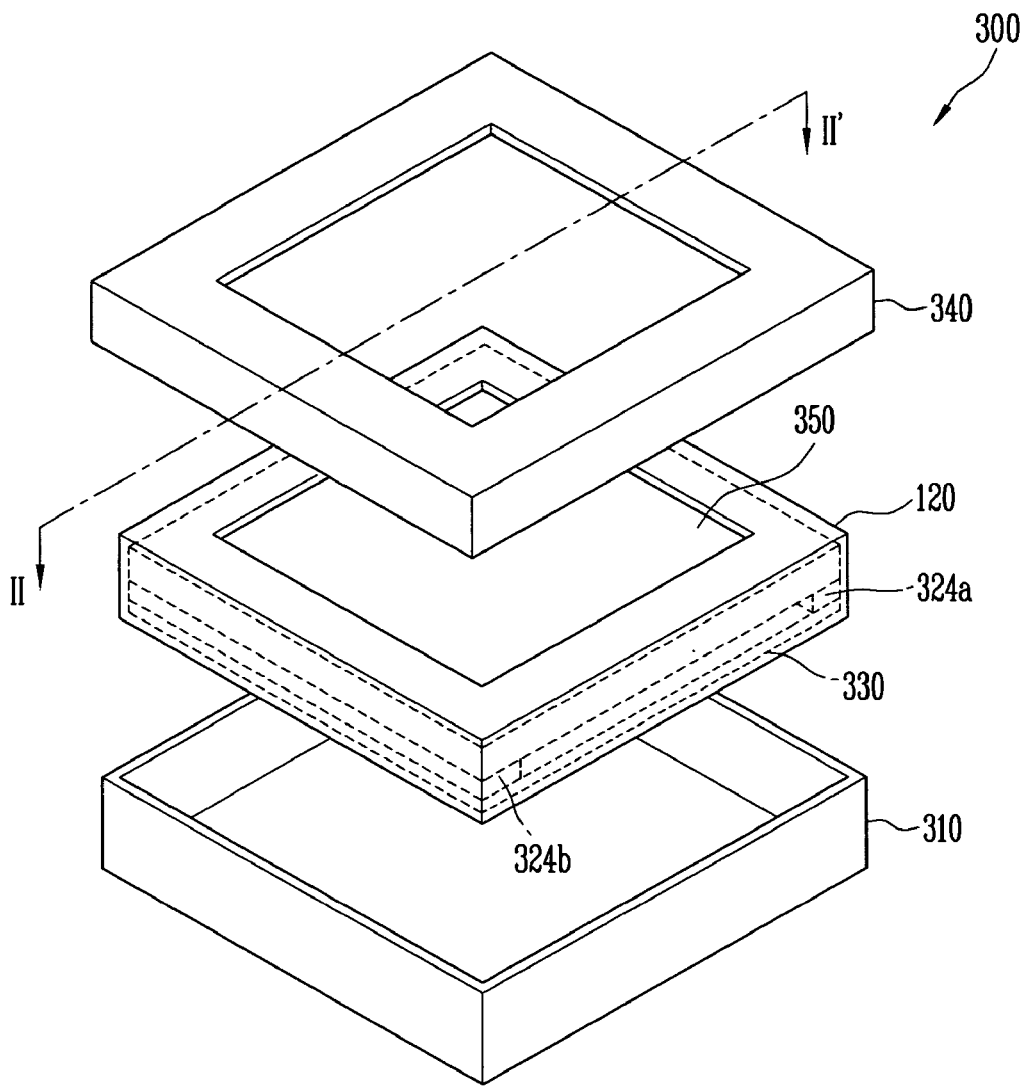
FIG. 3 is an exploded schematic perspective view showing the constitution of a flat panel display having enhanced thermal dissipation uniformity according to the present invention.
Figure 4:
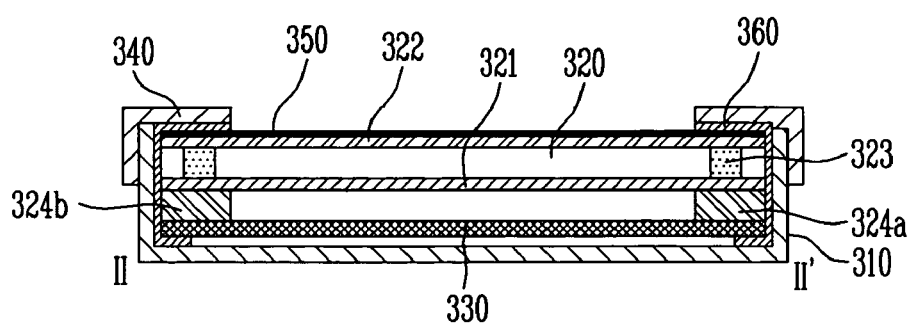
FIG. 4 is a cross sectional view of the flat panel display taken along line II-II' in FIG. 3.

Referring to FIGS. 3 and 4, a flat panel display 300 having enhanced thermal dissipation uniformity according to the present invention includes an image display panel 320 wherein a first substrate 321 is spaced apart from a second substrate 322. A transparent conductive film 350 is formed on the front side of the image display panel. A chassis member 330 is positioned on the rear side of the image display panel 320. A conductive member 360 connects the transparent conductive film 350 and the chassis member 330.

In an exemplary embodiment, a bottom cover 310 fixes and surrounds the rear side and the outer portion of the image display panel 320 and a top cover 340 surrounds a front outer portion of the image display panel 320.

Figure 5:
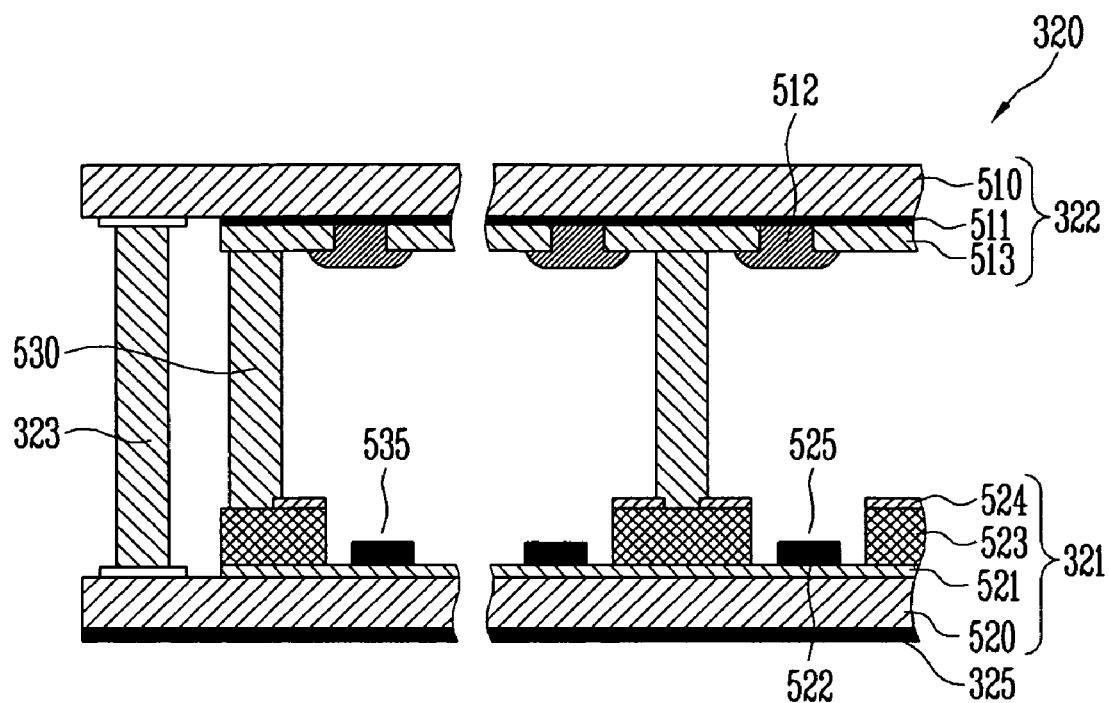
FIG. 5 is a cross sectional view schematically showing the structure of the image display panel in FIG. 4.

Referring now to FIG. 5, in the image display panel 320 the first substrate 321, which is an electron emission substrate, is spaced apart from the second substrate 322, which is an image forming substrate. A vacuum state is maintained between the first substrate 321 and the second substrate 322. A supporting member 323 is included between and supports the first substrate 321 and the second substrate 322.

In the image display panel 320, panel drivers include a data driver 324a and a scan driver 324b which respectively provide a data signal and a scan signal.

More specifically, the first substrate 321, which is an electron emission substrate of the image display panel 320, forms a cathode electrode 521 on a transparent substrate 520 in a predetermined shape, such as a stripe shape. The electron emission device includes an electron emitter 522 in the area where the direction of cathode electrode 521 intersects with the direction of gate electrode 524. Indium tin oxide (ITO) may be used for the cathode electrode 521.

An insulating layer 523, which is formed on the upper part of the substrate 520 and the cathode electrode 521, electrically insulates the cathode electrode 521 and the gate electrode 524. The insulating layer 523 includes at least one first hole 525 on the intersecting area of the cathode electrodes 521 and the gate electrodes 524 so that the cathode electrode 521 is exposed.

The gate electrodes 524 are arranged on the insulating layer 523 in a predetermined shape, for example, a stripe shape, in the direction of intersecting with the cathode electrode 521 to provide respective data signal or scan signal applied from a data electrode driver or a scan electrode driver to each electron emission device. The gate electrode 524 includes at least one second hole 535 corresponding to the first hole so that the electron emitter 522 is exposed.

The second substrate 322, which is an image forming substrate, includes: a transparent substrate 510, an anode electrode 511 formed on the upper part of the transparent substrate 510, a phosphor 512 light-emitted by the electron emitted from an electron emitter 522 on the upper part of the anode electrode 511, and an optical shielding film formed between the phosphors 512.

The image display panel 320 is maintained in a vacuum state by sealing the first substrate 321 and the second substrate 322 and includes supporting means 323 for separating apart and supporting the two substrates 321, 322.

Also, an internal vacuum space between the first substrate 321 and the second substrate 322 is provided with the supporting means 323 for withstanding atmospheric pressure applied from the outside of the image display 300. A spacer 530 further maintains and supports the space. One end of the spacer 530 contacts with the upper part of the optical shielding film 513 and the other end contacts with the upper part of the insulating layer 523.

Although the image display panel 320 gives an example of an upper gate structure as an electron emission device, it is not limited thereto. Various structures including a lower gate structure and a double gate structure are available as the structure for emitting an electron.

In the image display panel 320, positive (+) voltage is applied to the cathode electrode 521 of the image display panel, negative (−) voltage is applied to the gate electrode 524 and positive voltage (+) is applied to the optical shielding film 513, from a power source. Thereby, an electric field is formed around the electron emitter 522 by means of a voltage difference between the cathode electrode 521 and the gate electrode 524 to emit electrons, and the emitted electrons are induced by high voltage applied to the anode electrode 511 to collide with the phosphor area 512 of the corresponding pixel, implementing gray scale of the image.

In the image display panel constituted as described above respective data driver 324a, and scan driver 324b provide a data signal and a scan signal. Data driver 324a and scan driver 324b are positioned on the rear side of the image display panel 320. The heat generated from data driver 324a and scan driver 324b is transferred through the supporting means 323, raising the entire temperature of the image display panel 320.

Therefore, in order to dissipate the heat of the image display panel 320, a chassis member is provided on the rear side of the image display panel 320.

More specifically, the chassis member 330 is formed of metal substance with excellent thermal conductivity, and is provided on the lower end of the panel drivers (data driver and scan driver 324a, 324b) positioned on the rear side of the image display panel 320. The chassis member 330, which is provided in approximately the same size as the image display panel 320, receives entire heat from the image display panel 320. Since the panel drivers (data driver 324a and scan driver 324b) directly contact the chassis member 330, the heat generated from the panel drivers can be directly transferred to the chassis member 330, reducing the heat transferred to the image display panel 320.

The transparent conductive film 350 on the front side of the second substrate of the image display panel may be coated with a transparent conductive substance and may be formed of a substance with excellent thermal conductivity The conductive member 360 may be formed as a conductive tape of a copper substance and is formed in a edge area of the side, front side and rear side of the image display panel to connect the chassis member 330 with the transparent conductive film 350

The transparent conductive film 350 conducts the heat on the front side of the image display panel through the chassis member 330 which is positioned on the rear side thereof by means of the conductive member 360, reducing the difference of the entire temperature of the image display panel.

Therefore, by uniformly maintaining the temperature of the image display panel, distortion of the emission beam, failure of uniform light-emitting of the phosphor around the spacer and resulting poor image display can all be prevented.

Bottom cover 310 is formed of aluminum material and surrounds the bottom and sides of the image display panel.

The top cover 340 is engaged with the bottom cover 310 by bending a predetermined edge area in order to secure together the flat panel display 300.

Although exemplary embodiments of the present invention have been shown and described, those skilled in the art would appreciate that changes may be made to the embodiments without departing from the principles and spirit of the invention, the scope of which is defined in the claims and their equivalents.

What is claimed is:

1. A flat panel display having enhanced thermal dissipation uniformity comprising:
   an image display panel having a first substrate spaced apart from a second substrate;
   a transparent conductive film on a front side of the image display panel;
   a chassis member on a rear side of the image display panel; and a thermally conductive member connecting the transparent conductive film to the chassis member for heat transfer.

2. The flat panel display having enhanced thermal dissipation uniformity of claim 1, wherein the transparent conductive film is on the front side of the second substrate and is coated with a conductive substance.

3. The flat panel display having enhanced thermal dissipation uniformity of claim 1, wherein the transparent conductive film is a thermal conductive substance.

4. The flat panel display having enhanced thermal dissipation uniformity of claim 1, wherein the chassis is a conductive metal.

5. The flat panel display having enhanced thermal dissipation uniformity of claim 1, wherein the conductive member is a conductive tape.

6. The flat panel display having enhanced thermal dissipation uniformity of claim 5, wherein the conductive member is a copper substance.

7. The flat panel display having enhanced thermal dissipation uniformity of claim 1, wherein the conductive member is in an edge area of the front, side, and rear of the image display panel for connecting the chassis member to the transparent conductive film.

8. The flat panel display having enhanced thermal dissipation uniformity of claim 1, wherein the transparent conductive film is for conducting heat to the chassis member through the conductive member.

9. The flat panel display having enhanced thermal dissipation uniformity of claim 1, wherein the image display panel includes:
   a first substrate having an electron emission device in an area defined by an intersection of a cathode electrode direction and a gate electrode direction;
   a second substrate for displaying an image by means of the electron emitted from the electron emission device of the first substrate; and
   a support between the first substrate and second substrate for supporting the first substrate and the second substrate and for maintaining a vacuum state between the first substrate and the second substrate.

10. The flat panel display having enhanced thermal dissipation uniformity of claim 1, wherein a data driver and a scan driver for providing signals are on the rear side of the image display panel.

* * * * *